(12) United States Patent
Mese et al.

(10) Patent No.: US 12,080,296 B2
(45) Date of Patent: Sep. 3, 2024

(54) APPARATUS, METHOD, AND PROGRAM PRODUCT FOR PERFORMING A TRANSCRIPTION ACTION

(71) Applicant: LENOVO (Singapore) PTE. LTD., New Tech Park (SG)

(72) Inventors: John C. Mese, Cary, NC (US); Arnold S. Weksler, Raleigh, NC (US); Mark Patrick Delaney, Raleigh, NC (US); Nathan J. Peterson, Oxford, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 220 days.

(21) Appl. No.: 17/203,652

(22) Filed: Mar. 16, 2021

(65) Prior Publication Data

US 2022/0301565 A1 Sep. 22, 2022

(51) Int. Cl.
*G10L 15/22* (2006.01)
*G06F 16/683* (2019.01)
*G10L 15/26* (2006.01)
*G10L 25/60* (2013.01)
*H04L 12/18* (2006.01)

(52) U.S. Cl.
CPC ............ *G10L 15/26* (2013.01); *G06F 16/685* (2019.01); *G10L 15/22* (2013.01); *G10L 25/60* (2013.01); *H04L 12/1831* (2013.01); *G10L 2015/225* (2013.01)

(58) Field of Classification Search
CPC ................................ G10L 15/22; G10L 15/26
See application file for complete search history.

(56) References Cited

U.S. PATENT DOCUMENTS

| | | | |
|---|---|---|---|
| 7,487,096 B1 * | 2/2009 | Cox | G10L 15/187 704/277 |
| 7,653,543 B1 * | 1/2010 | Blair | G10L 17/26 704/271 |
| 2004/0252979 A1 * | 12/2004 | Momosaki | H04N 5/445 348/E5.122 |
| 2015/0244486 A1 * | 8/2015 | Liang | H04L 5/0055 370/337 |
| 2015/0382071 A1 * | 12/2015 | Aravamudan | H04N 21/812 725/14 |
| 2017/0289486 A1 * | 10/2017 | Stroffolino | H04N 5/60 |
| 2018/0373488 A1 * | 12/2018 | Chisu | H04N 21/4394 |
| 2022/0101857 A1 * | 3/2022 | Saunders | G10L 15/26 |

* cited by examiner

*Primary Examiner* — Jialong He
(74) *Attorney, Agent, or Firm* — Kunzler Bean & Adamson (57) ABSTRACT

Apparatuses, methods, and program products are disclosed for performing a transcription action. One apparatus includes at least one processor and a memory that stores code executable by the at least one processor. The code is executable by the processor to monitor, by use of the at least one processor, a quality of audio information. The code is executable by the processor to determine whether the quality of the audio information is below a predetermined threshold. The code is executable by the processor to, in response to determining that the quality of the audio information is below the predetermined threshold, perform a transcription action corresponding to the audio information.

19 Claims, 6 Drawing Sheets

APPARATUS, METHOD, AND PROGRAM PRODUCT FOR PERFORMING A TRANSCRIPTION ACTION

BACKGROUND

Field

The subject matter disclosed herein relates to information handling devices and more particularly relates to performing a transcription action.

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions, such as for conducting teleconferences. It may be difficult to hear individuals participating in such teleconferences.

BRIEF SUMMARY

An apparatus for performing a transcription action is disclosed. A method and computer program product also perform the functions of the apparatus. In one embodiment, the apparatus includes at least one processor and a memory that stores code executable by the at least one processor. The code, in various embodiments, is executable by the processor to monitor, by use of the at least one processor, a quality of audio information. The code, in some embodiments, is executable by the processor to determine whether the quality of the audio information is below a predetermined threshold. The code, in certain embodiments, is executable by the processor to, in response to determining that the quality of the audio information is below the predetermined threshold, perform a transcription action corresponding to the audio information.

In some embodiments, performing the transcription action corresponding to the audio information includes automatically providing a user with a textual representation of the audio information.

A method for performing a transcription action, in one embodiment, includes monitoring, by use of at least one processor, a quality of audio information. In various embodiments, the method includes determining whether the quality of the audio information is below a predetermined threshold. In certain embodiments, the method includes, in response to determining that the quality of the audio information is below the predetermined threshold, performing a transcription action corresponding to the audio information.

In some embodiments, performing the transcription action corresponding to the audio information includes automatically providing a user with a textual representation of the audio information. In various embodiments, automatically providing the user with the textual representation of the audio information includes providing the user with the textual representation of the audio information together with the audio information. In one embodiment, performing the transcription action corresponding to the audio information includes notifying a user of an option to receive the textual representation of the audio information. In some embodiments, the method, in response to the user selecting the option to receive the textual representation of the audio information, providing the user with the textual representation of the audio information. In certain embodiments, the quality of the audio information includes a sound quality, a connectivity quality, a volume quality, a speed quality, a language quality, and/or a historical quality.

In some embodiments, the method includes maintaining a mapping between prior instances in which the quality of the audio information is below the predetermined threshold and users corresponding to the prior instances. In various embodiments, the audio information includes real-time speech. In certain embodiments, the real-time speech occurs in a teleconference.

In some embodiments, monitoring the quality of the audio information includes monitoring the quality of the audio information provided electronically to the user. In various embodiments, the predetermined threshold includes a sound quality level, a connectivity quality level, a volume quality level, a speed quality level, a language quality level, a historical quality level, and/or a feedback level. In certain embodiments, the historical quality level is determined based on a history of poor audio information quality. In some embodiments, determining that the quality of the audio information is below the predetermined threshold includes detecting that a feedback response from a user indicates that the quality of the audio information is below the predetermined threshold.

In one embodiment, a program product includes a computer readable storage medium that stores code executable by at least one processor. The executable code, in certain embodiments, includes code to perform monitoring, by use of the at least one processor, a quality of audio information. The executable code, in some embodiments, includes determining whether the quality of the audio information is below a predetermined threshold. The executable code, in various embodiments, includes, in response to determining that the quality of the audio information is below the predetermined threshold, performing a transcription action corresponding to the audio information.

In certain embodiments, performing the transcription action corresponding to the audio information includes notifying a user of an option to receive the textual representation of the audio information. In one embodiment, the executable code further comprises code to perform, in response to the user selecting the option to receive the textual representation of the audio information, providing the user with the textual representation of the audio information.

In certain embodiments, the quality of the audio information comprises a sound quality, a connectivity quality, a volume quality, a speed quality, a language quality, and/or a historical quality. In some embodiments, the predetermined threshold comprises a sound quality level, a connectivity quality level, a volume quality level, a speed quality level, a language quality level, a historical quality level, and/or a feedback level.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
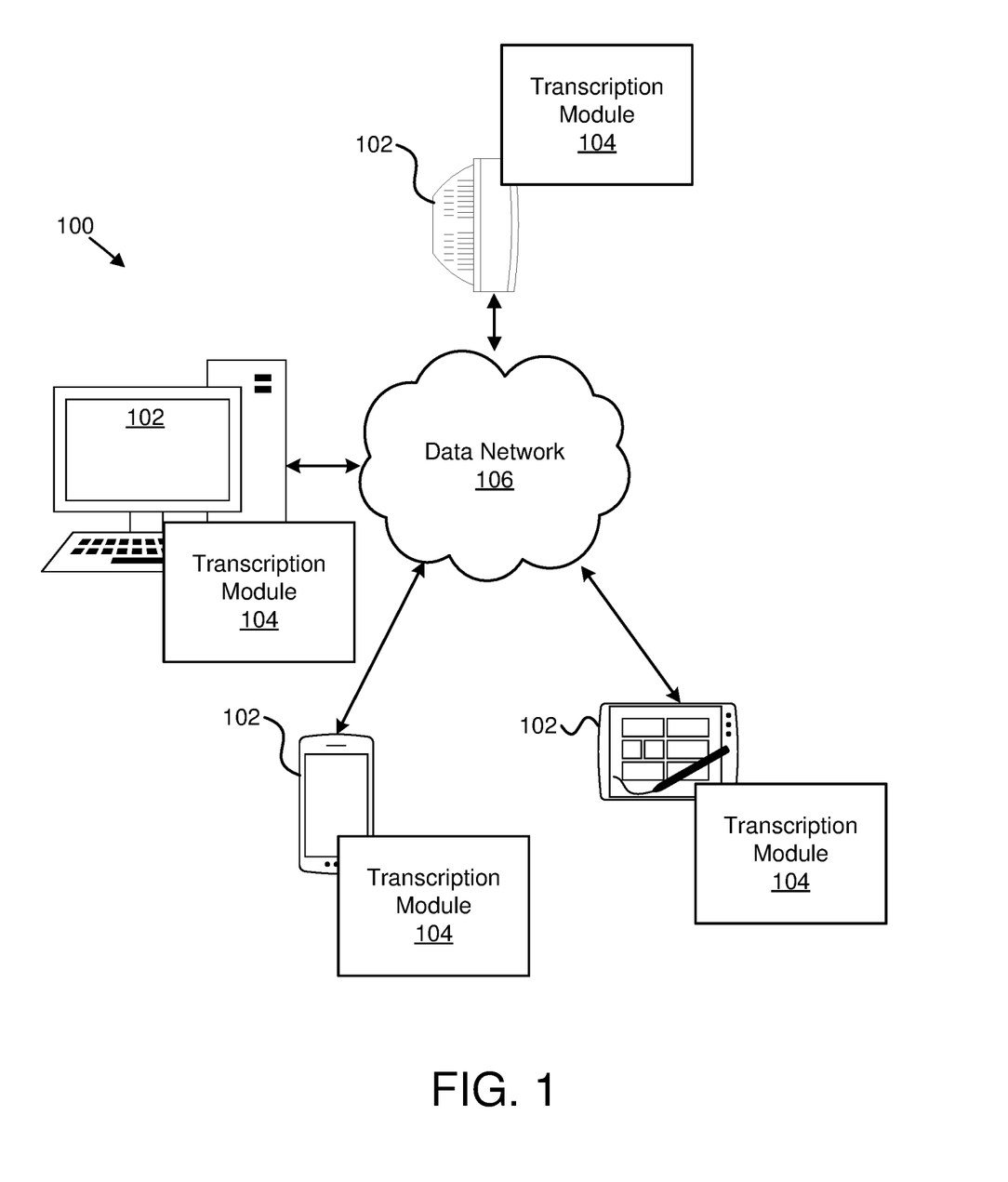
FIG. 1 is a schematic block diagram illustrating one embodiment of a system for performing a transcription action.

FIG. 1 depicts one embodiment of a system 100 for performing a transcription action. In one embodiment, the system 100 includes information handling devices 102, transcription modules 104, and data networks 106. Even though a specific number of information handling devices 102, transcription modules 104, and data networks 106 are depicted in FIG. 1, one of skill in the art will recognize that any number of information handling devices 102, transcription modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the transcription module 104. In certain embodiments, the transcription module 104 may monitor, by use of at least one processor, a quality of audio information. In some embodiments, the transcription module 104 may determine whether the quality of the audio information is below a predetermined threshold. The transcription module 104 may also, in response to determining that the quality of the audio information is below the predetermined threshold, perform a transcription action corresponding to the audio information. In this manner, the transcription module 104 may be used for performing a transcription action.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
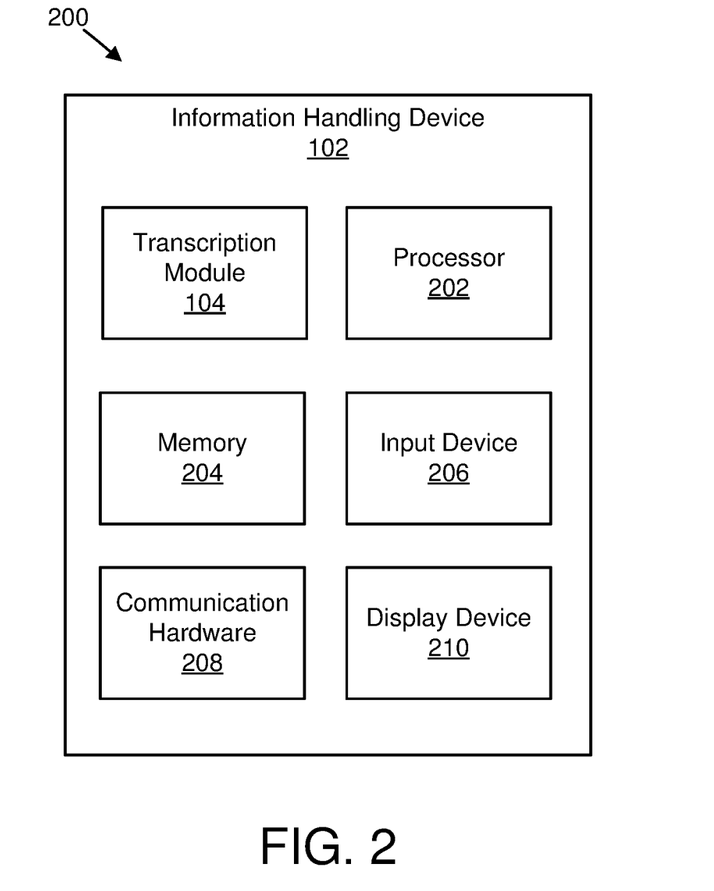
FIG. 2 is a schematic block diagram illustrating one embodiment of an apparatus including an information handling device.

FIG. 2 depicts one embodiment of an apparatus 200 that may be used for performing a transcription action. The apparatus 200 includes one embodiment of the information handling device 102. Furthermore, the information handling device 102 may include the transcription module 104, a processor 202, a memory 204, an input device 206, communication hardware 208, and optionally a display device

210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the transcription module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system or other controller algorithms operating on the information handling device 102.

The information handling device 102 may use the transcription module 104 for performing a transcription action. As may be appreciated, the transcription module 104 may include computer hardware, computer software, or a combination of both computer hardware and computer software. For example, the transcription module 104 may include circuitry, or the processor 202, used to monitor, by use of at least one processor (e.g., the processor 202), a quality of audio information. As another example, the transcription module 104 may include computer program code that determines whether the quality of the audio information is below a predetermined threshold. As a further example, the transcription module 104 may include computer program code that, in response to determining that the quality of the audio information is below the predetermined threshold, performs a transcription action corresponding to the audio information.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the transcription module 104.

In some embodiments, a user of an information handling device 102 may have difficulty hearing and/or understanding audible information spoken by individuals. Described herein are various embodiments that use a transcription module 104 to perform a transcription action based on a quality of the audible information spoken by individuals.

Figure 3:
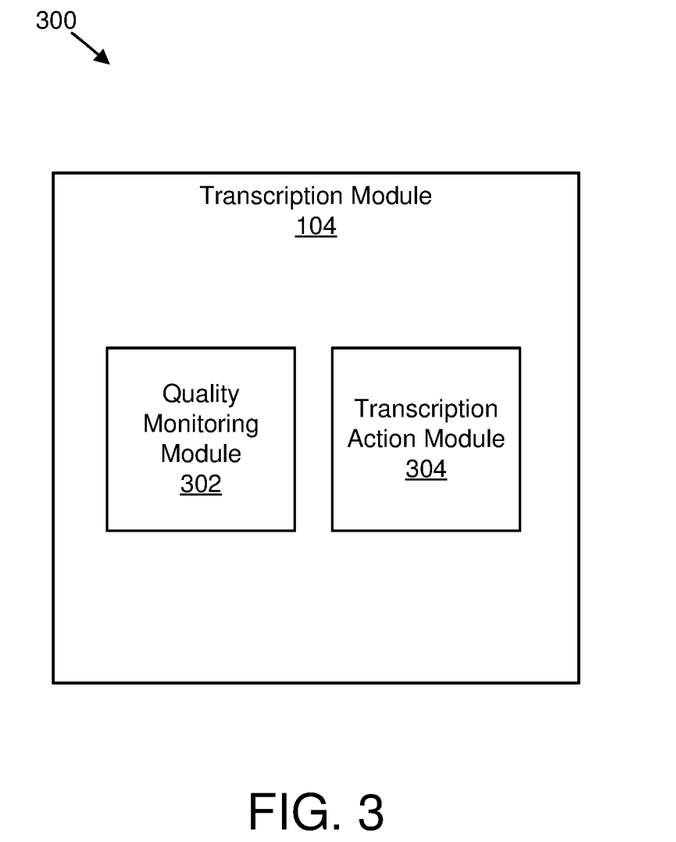
FIG. 3 is a schematic block diagram illustrating one embodiment of an apparatus including a transcription module.

FIG. 3 depicts a schematic block diagram illustrating one embodiment of an apparatus 300 (e.g., information handling device 102) that includes one embodiment of the transcription module 104. Furthermore, the transcription module 104 includes a quality monitoring module 302 and a transcription action module 304.

In certain embodiments, the quality monitoring module 302 may monitor, by use of at least one processor (e.g., processor 202), a quality of audio information. In various embodiments, the quality of the audio information may include a sound quality, a connectivity quality, a volume quality, a speed quality, a language quality, and/or a historical quality. In some embodiments, the quality may be ranked as low (e.g., poor), medium (e.g., good), or high (e.g., excellent, great). In certain embodiments, the quality may be given a numeric ranking with a range (e.g., 1 to 10). In one embodiment, a high quality may have a high numeric ranking, such as 10, and a low quality may have a low numeric ranking, such as 1. In another embodiment, a high quality may have a low numeric ranking, such as 1, and a low quality may have a high numeric ranking, such as 10.

A sound quality may be determined by monitoring an incoming audio signal received by an audio input. The sound quality may refer to dips (e.g., unexpected drops and/or changes) in the audio signal (e.g., such as if a person is outside, has noise interference, is in a car, and/or has connectivity issues. A connectivity quality may be determined by monitoring network parameters, such as speed, connection consistency, bandwidth, and so forth. In one example, connection quality may be impacted by dips in throughput. A volume quality may be determined by monitoring a volume (e.g., amplitude) of the incoming audio signal. Poor volume quality may occur if there is an equalization imbalance or if one person has a low volume relative to other persons in a conversation (e.g., soft-talkers, COVID mask impacts).

A speed quality may be determined by monitoring a rate of speech of people in a conversation. The speed quality may be based on the speech of one person relative to the group of people in the conversation (e.g., if one person has a higher rate of speech relative to the group of people in the conversation, the speed quality of that person may be low). A language quality may be determined by monitoring words, dialects, accents, and/or other factors corresponding to speech of people in the conversation. A low language quality may be determined if a heavy accent is detected, if participants ask a person to repeat themselves, if a participant makes a comment such as "could you repeat that" or "didn't catch that," and so forth. A historic quality may be determined my analyzing historical quality from a prior conversation and/or person. For example, historic quality may be determined by monitoring which participants were involved in previous teleconferences that resulted in quality issues (e.g., a low quality).

In certain information, the audio information monitored includes real-time speech. In various embodiments, the real-time speech occurs in a teleconference. In some embodiments, the audio information may be recorded speech, speech in a live meeting, a video conference, an audio conference, a presentation, a live conversation, recorded video, recorded audio, live video, live audio (e.g., audio spoken by a person in real-time), and so forth. In some embodiments, monitoring the quality of the audio information includes monitoring the quality of the audio information provided electronically to the user (e.g., via a computer, a cell phone, an information handling device 102). In various embodiments, monitoring may mean dynamically detecting conditions in which a live transcription would be helpful to a user. In such embodiments, the user may not be aware of an option for a live transcription, so if the quality of the audio information is poor, the user may be notified of the option for the live transcription and/or automatically provided the live transcription. As may be appreciated, monitoring the quality of the audio information may mean monitoring for feedback from users indicating the quality, monitoring and/or analyzing a connection quality, monitoring and/or analyzing a digital audio signal (e.g., to detect irregularities, rapid changes in amplitude, gaps in the signal, inconsistencies, and so forth), and so forth.

In one embodiment, the transcription action module 304 may determine whether the quality of the audio information is below a predetermined threshold and, in response to determining that the quality of the audio information is below the predetermined threshold, perform a transcription action corresponding to the audio information. In some embodiments, performing the transcription action corresponding to the audio information includes automatically (e.g., without notifying the user, in response to detecting low quality and without receiving user input after detecting the low quality) providing a user with a textual representation of the audio information (e.g., transcription). In various embodiments, automatically providing the user with the textual representation of the audio information includes providing the user with the textual representation of the audio information together with the audio information (e.g., in a teleconference software in which the audio is provided and the textual representation is shown on the screen as the audio is provided). As may be appreciated, providing the user with the textual representation may include converting audible speech to text in real time. In certain embodiments, a user's device may not be able to convert the speech to text. In such embodiments, a device remote from the user's device may convert the speech to text (e.g., the remote device may be a cloud server, a software server, another user's device). The device remote from the user's device may provide the transcription of the speech to text to the user's device.

In various embodiments, performing the transcription action corresponding to the audio information includes notifying a user of an option to receive the textual representation of the audio information (e.g., via a pop up message or pop up box that has an option for the user to select to receive the textual representation of the audio information). In such embodiments, in response to the user selecting the option to receive the textual representation of the audio information, transcription action module 304 may provide the user with the textual representation of the audio information (e.g., to a display of the user's device).

In some embodiments, the predetermined threshold includes a sound quality level, a connectivity quality level, a volume quality level, a speed quality level, a language quality level, a historical quality level, and/or a feedback level. The predetermined threshold may be a numeric value that represents a minimum acceptable quality level or a maximum acceptable quality level. The predetermined threshold may be determined by the transcription module 104, set by a user, learned over time using data gathered over a time period, and so forth. In certain embodiments, the historical quality level may be determined based on a history of poor audio information quality. In various embodiments, determining that the quality of the audio information is below the predetermined threshold includes detecting that a feedback response from a user indicates that the quality of the audio information is below the predetermined threshold.

In some embodiments, the transcription module 104 may maintain (e.g., store) a mapping between prior instances in which the quality of the audio information is below the predetermined threshold and users corresponding to the prior instances. This information may be used as historical data for determining whether to provide a textual representation of the audio information to participants based on other participants in a meeting.

Figure 4:
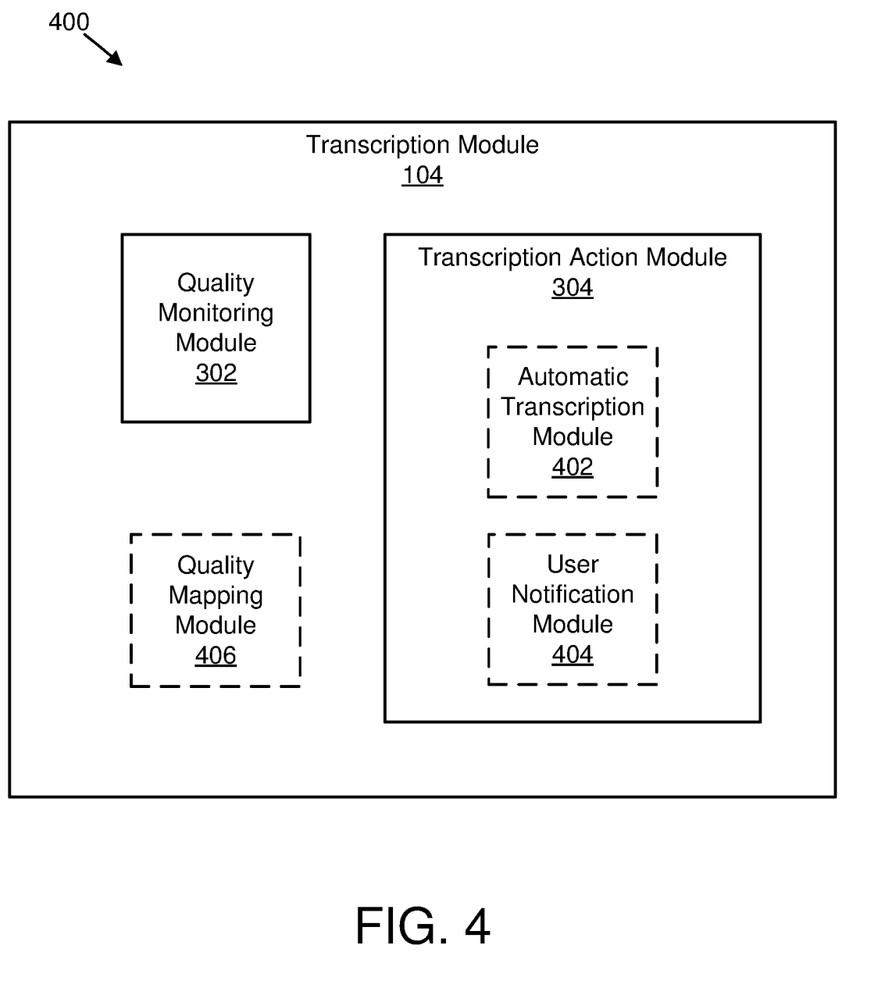
FIG. 4 is a schematic block diagram illustrating another embodiment of an apparatus including a transcription module.

FIG. 4 is a schematic block diagram illustrating another embodiment of an apparatus 400 that includes one embodiment of the transcription module 104. Furthermore, the transcription module 104 includes one embodiment of the quality monitoring module 302 and the transcription action module 304, that may be substantially similar to the quality monitoring module 302 and the transcription action module 304 described in relation to FIG. 3. The transcription action module 304 may optionally include an automatic transcription module 402 and/or a user notification module 404. The transcription module 104 may optionally include a quality mapping module 406.

The automatic transcription module 402 may perform the transcription action corresponding to the audio information automatically (e.g., without notifying the user, in response to detecting low quality and without receiving user input after detecting the low quality) by providing a user with a textual representation of the audio information (e.g., transcription). The automatic transcription module 402 may facilitate displaying the textual representation of the audio information to a display of a user's device. In various embodiments, automatically providing the user with the textual representation of the audio information includes providing the user with the textual representation of the audio information together with the audio information (e.g., in a teleconference software in which the audio is provided and the textual representation is shown on the screen as the audio is provided).

In some embodiments, the user notification module 404 may notify a user of an option to receive the textual representation of the audio information (e.g., via a pop up message or pop up box that has an option for the user to select to receive the textual representation of the audio information). In such embodiments, in response to the user selecting the option to receive the textual representation of the audio information, transcription user notification module 404 may provide the user with the textual representation of the audio information (e.g., to a display of the user's device).

In various embodiments, the quality mapping module 406 may maintain (e.g., store) a mapping between prior instances in which the quality of the audio information is below the predetermined threshold and users corresponding to the prior instances. This information may be used as historical data for determining whether to provide a textual representation of the audio information to participants based on other participants in a meeting.

Figure 5:
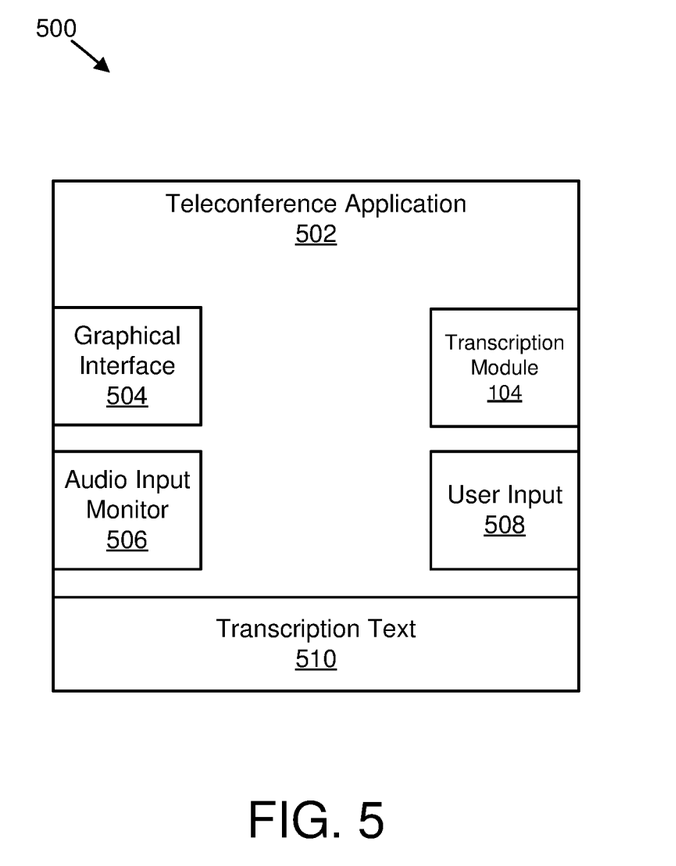
FIG. 5 is a schematic block diagram illustrating one embodiment of a teleconference application including a transcription module.

FIG. 5 is a schematic block diagram 500 illustrating one embodiment of a teleconference application 502 including an embodiment of the transcription module 104. The teleconference application 502 includes a graphical interface 504, an audio input monitor 506, a user input 508, and a transcription text 510. The graphical interface 504 may be used to show video and/or pictures of participants in a teleconference (e.g., video meeting). The graphical interface 504 may also be used to show presentation materials and/or videos. The audio input monitor 506 may receive and/or monitor audio input (e.g., speech) that occurs during the teleconference. The transcription module 104 may use the data from the audio input monitor 506 to determine whether to provide and/or display the transcription text 510 as described herein. As may be appreciated, the transcription text 510 may be automatically provided to a user (e.g., without the user explicitly indicating that it should be provided), or may be provided after the user input 508 is received to indicate that the transcription text 510 should be displayed (e.g., in response to the transcription module 104 automatically providing a notification to the user that the transcription text 510 is available and/or recommended based on low audio quality).

Figure 6:
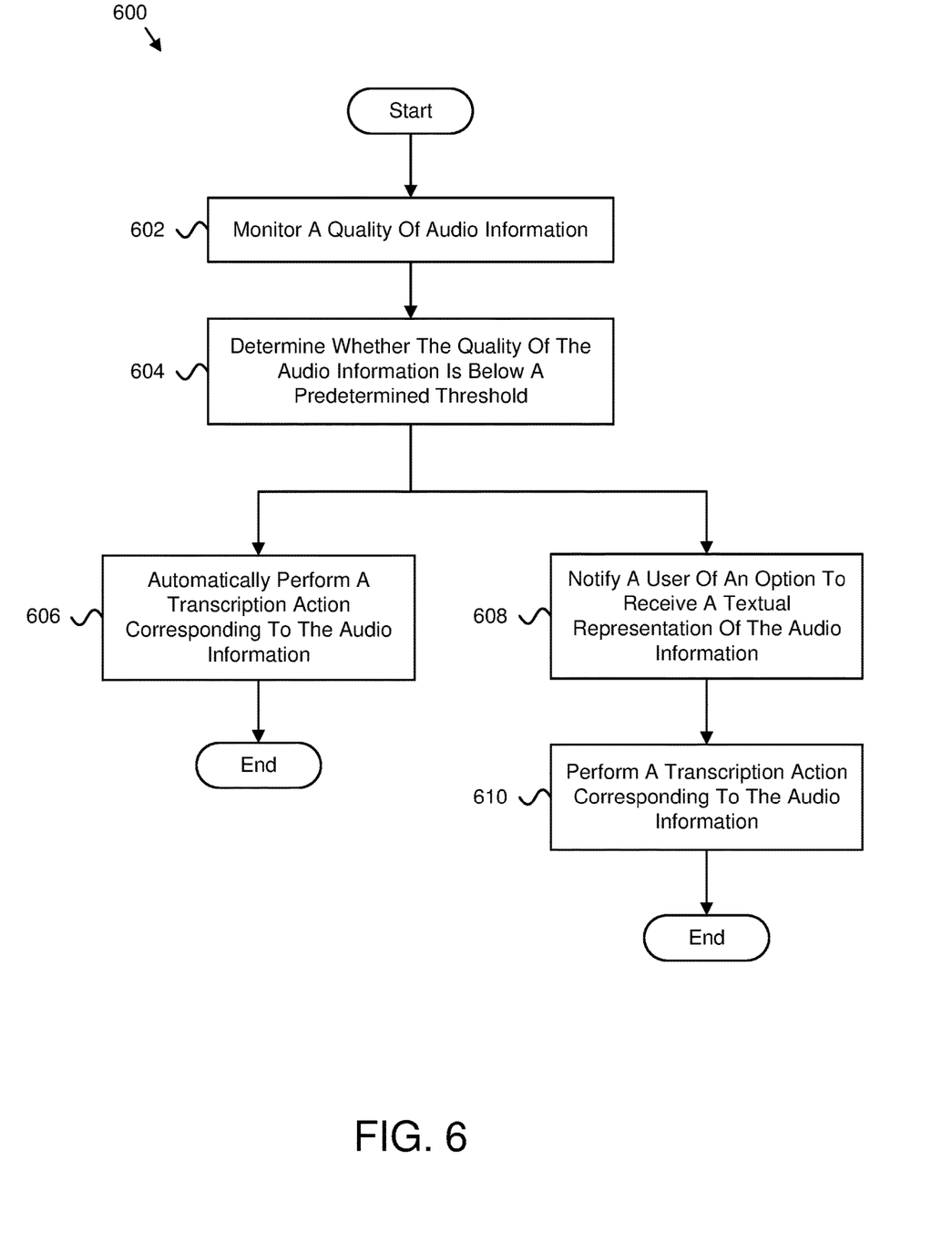
FIG. 6 is a schematic flow chart diagram illustrating an embodiment of a method for performing a transcription action.

FIG. 6 is a schematic flow chart diagram illustrating an embodiment of a method 600 for performing a transcription action. In some embodiments, the method 600 is performed by an apparatus, such as the information handling device 102. In other embodiments, the method 600 may be performed by a module, such as the transcription module 104. In certain embodiments, the method 600 may be performed by a processor executing program code, for example, a microcontroller, a microprocessor, a CPU, a GPU, an auxiliary processing unit, a FPGA, or the like.

The method 600 may include monitoring 602, by use of at least one processor, a quality of audio information. In certain embodiments, the quality monitoring module 302 may monitor 602 the quality of audio information.

In some embodiments, the quality of the audio information includes a sound quality, a connectivity quality, a volume quality, a speed quality, a language quality, and/or a historical quality. In various embodiments, the audio information includes real-time speech. In certain embodiments, the real-time speech occurs in a teleconference. In some embodiments, monitoring 602 the quality of the audio information includes monitoring the quality of the audio information provided electronically to the user.

The method 600 may include determining 604 whether the quality of the audio information is below a predetermined threshold. In certain embodiments, the transcription action module 304 may determine 604 whether the quality of the audio information is below the predetermined threshold In one embodiment, the method 600 may include, in response to determining that the quality of the audio information is below the predetermined threshold, automatically perform 606 a transcription action corresponding to the audio information. In some embodiments, the transcription action module 304 may, in response to determining that the quality of the audio information is below the predetermined threshold, automatically perform 606 the transcription action corresponding to the audio information.

In certain embodiments, automatically performing 606 the transcription action corresponding to the audio information includes automatically providing a user with a textual representation of the audio information. In various embodiments, automatically providing the user with the textual representation of the audio information includes providing the user with the textual representation of the audio information together with the audio information.

In some embodiments, the method 600 may include, in response to determining that the quality of the audio information is below the predetermined threshold, notifying 608 a user of an option to receive the textual representation of the audio information. In certain embodiments, in response to the user selecting the option to receive the textual representation of the audio information, the method 600 includes providing 610 the user with the textual representation of the audio information.

In various embodiments, the predetermined threshold includes a sound quality level, a connectivity quality level, a volume quality level, a speed quality level, a language quality level, a historical quality level, and/or a feedback level. In some embodiments, the historical quality level is determined based on a history of poor audio information quality. In certain embodiments, determining that the quality of the audio information is below the predetermined threshold includes detecting that a feedback response from a user indicates that the quality of the audio information is below the predetermined threshold.

In various embodiments, the method 600 includes maintaining a mapping between prior instances in which the quality of the audio information is below the predetermined threshold and users corresponding to the prior instances.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
at least one processor; and
a memory that stores code executable by the at least one processor to:
monitor, by use of the at least one processor, a quality of audio information, wherein the quality comprises a language quality of spoken words, the language quality is determined based on an audible expression to request the spoken words being repeated, and the audio information comprises the spoken words, and wherein the quality of the audio information further comprises a volume quality indicating a relative sound volume of a person to other persons in a group, and a speed quality indicating a relative speech rate of a person to other persons in the group;
determine whether the quality of the audio information is below a predetermined threshold;
in response to determining that the quality of the audio information is below the predetermined threshold, perform a transcription action corresponding to the audio information;
maintain a mapping between prior instances in which the quality of the audio information is below the predetermined threshold and users corresponding to the prior instances; and
determine, based on the mapping, whether to provide a textual representation of the audio information to participants in a meeting based on other participants in the meeting.

2. The apparatus of claim 1, wherein performing the transcription action corresponding to the audio information comprises automatically providing a user with a textual representation of the audio information.

3. A method comprising:
monitoring, by use of at least one processor, a quality of audio information, wherein the quality comprises a language quality of spoken words, the language quality is determined based on an audible expression to request the spoken words being repeated, and the audio information comprises the spoken words, and wherein the quality of the audio information further comprises a volume quality indicating a relative sound volume of a person to other persons in a group, and a speed quality indicating a relative speech rate of a person to other persons in the group;
determining whether the quality of the audio information is below a predetermined threshold;
in response to determining that the quality of the audio information is below the predetermined threshold, performing a transcription action corresponding to the audio information;
maintaining a mapping between prior instances in which the quality of the audio information is below the predetermined threshold and users corresponding to the prior instances; and
determining, based on the mapping, whether to provide a textual representation of the audio information to participants in a meeting based on other participants in the meeting.

4. The method of claim 3, wherein performing the transcription action corresponding to the audio information comprises automatically providing a user with a textual representation of the audio information.

5. The method of claim 4, wherein automatically providing the user with the textual representation of the audio information comprises providing the user with the textual representation of the audio information together with the audio information.

6. The method of claim 3, wherein performing the transcription action corresponding to the audio information comprises notifying a user of an option to receive the textual representation of the audio information.

7. The method of claim 6, further comprising, in response to the user selecting the option to receive the textual representation of the audio information, providing the user with the textual representation of the audio information.

8. The method of claim 3, wherein the quality of the audio information further comprises a connectivity quality, a historical quality, or a combination thereof.

9. The method of claim 3, wherein the audio information comprises real-time speech.

10. The method of claim 9, wherein the real-time speech occurs in a teleconference.

11. The method of claim 3, wherein monitoring the quality of the audio information comprises monitoring the quality of the audio information provided electronically to a user.

12. The method of claim 3, wherein the predetermined threshold comprises a sound quality level, a connectivity quality level, a volume quality level, a speed quality level, a language quality level, a historical quality level, a feedback level, or some combination thereof.

13. The method of claim 12, wherein the historical quality level is determined based on a history of poor audio information quality.

14. The method of claim 3, wherein determining that the quality of the audio information is below the predetermined threshold comprises detecting that a feedback response from a user indicates that the quality of the audio information is below the predetermined threshold.

15. A program product comprising a non-transitory computer readable storage medium that stores code executable by at least one processor, the executable code comprising code to perform:
monitoring, by use of the at least one processor, a quality of audio information, wherein the quality comprises a language quality of spoken words, the language quality is determined based on an audible expression to request the spoken words being repeated, and the audio information comprises the spoken words, and wherein the quality of the audio information further comprises a volume quality indicating a relative sound volume of a person to other persons in a group, and a speed quality indicating a relative speech rate of a person to other persons in the group;
determining whether the quality of the audio information is below a predetermined threshold;
in response to determining that the quality of the audio information is below the predetermined threshold, performing a transcription action corresponding to the audio information;
maintaining a mapping between prior instances in which the quality of the audio information is below the predetermined threshold and users corresponding to the prior instances; and
determining, based on the mapping, whether to provide a textual representation of the audio information to participants in a meeting based on other participants in the meeting.

16. The program product of claim 15, wherein performing the transcription action corresponding to the audio information comprises notifying a user of an option to receive the textual representation of the audio information.

17. The program product of claim 16, wherein the executable code further comprises code to perform, in response to the user selecting the option to receive the textual representation of the audio information, providing the user with the textual representation of the audio information.

18. The program product of claim 15, wherein the quality of the audio information comprises a connectivity quality, a historical quality, or a combination thereof.

19. The program product of claim 15, wherein the predetermined threshold comprises a sound quality level, a connectivity quality level, a volume quality level, a speed quality level, a language quality level, a historical quality level, a feedback level, or some combination thereof.

* * * * *